(12) United States Patent  (10) Patent No.: US 8,648,882 B2
Tsukagoshi  (45) Date of Patent: Feb. 11, 2014

(54) IMAGE DISPLAY APPARATUS AND IMAGE PROCESSING METHOD

(75) Inventor: Shinichi Tsukagoshi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 395 days.

(21) Appl. No.: 13/040,866

(22) Filed: Mar. 4, 2011

(65) Prior Publication Data

US 2011/0221783 A1    Sep. 15, 2011

(30) Foreign Application Priority Data

Mar. 12, 2010  (JP) ................................ 2010-055452

(51) Int. Cl.
```
G09G 5/00     (2006.01)
G09G 5/10     (2006.01)
H04N 3/22     (2006.01)
H04N 3/26     (2006.01)
```

(52) U.S. Cl.
USPC ............ 345/672; 345/690; 345/589; 348/745

(58) Field of Classification Search
USPC ............................. 345/672, 690, 589; 348/745
See application file for complete search history.

(56) References Cited

U.S. PATENT DOCUMENTS

| | | | |
|---|---|---|---|
| 4,857,998 A * | 8/1989 | Tsujihara et al. | 348/747 |
| 6,916,098 B2 * | 7/2005 | Salvatori et al. | 353/122 |
| 7,197,562 B2 * | 3/2007 | Murtha et al. | 709/224 |
| 7,379,124 B2 * | 5/2008 | George et al. | 348/745 |
| 7,397,476 B2 * | 7/2008 | Akaiwa et al. | 345/536 |
| 7,661,838 B2 * | 2/2010 | Chen | 362/183 |
| 7,991,833 B2 * | 8/2011 | Benenson | 709/203 |
| 8,199,261 B2 | 6/2012 | Nishimura et al. | |
| 8,294,834 B2 * | 10/2012 | Nishimura et al. | 348/745 |
| 2002/0060754 A1 * | 5/2002 | Takeuchi | 348/745 |
| 2003/0057892 A1 * | 3/2003 | Lee | 315/368.11 |
| 2003/0191836 A1 * | 10/2003 | Murtha et al. | 709/224 |
| 2005/0091302 A1 * | 4/2005 | Soin et al. | 709/200 |
| 2006/0279477 A1 * | 12/2006 | Allen et al. | 345/30 |
| 2008/0062164 A1 * | 3/2008 | Bassi et al. | 345/214 |
| 2008/0297542 A1 | 12/2008 | Todoroki et al. | |
| 2010/0026960 A1 * | 2/2010 | Sprague | 353/28 |
| 2010/0107018 A1 * | 4/2010 | Benenson | 714/57 |

FOREIGN PATENT DOCUMENTS

| | | |
|---|---|---|
| JP | A-2008-096806 | 4/2008 |
| JP | A-2008-298948 | 12/2008 |
| KR | 10-2009-0012119 A | 2/2009 |

* cited by examiner

*Primary Examiner* — M Good Johnson
(74) *Attorney, Agent, or Firm* — Oliff PLC (57) ABSTRACT

An image display apparatus includes: a primary image processing device that performs image processing for an input image represented by input image information; a secondary image processing device that performs image processing for the input image processed by the primary image processing device; a light modulator that modulates an illumination light based on the input image information representing the input image processed by the secondary image processing device; and a projection optical system that projects the modulated light onto a screen as an image, wherein the secondary image processing device performs position adjustment processing, and outputs position information representing the display position of the input image to the primary image processing device after the position adjustment processing on the input image is completed, and the primary image processing device reflects the position information outputted from the secondary image processing device to perform position adjustment on the input image information.

9 Claims, 7 Drawing Sheets

INPUT IMAGE

IMAGE OUTPUT BY PRIMARY IMAGE PROCESSING DEVICE

REFLECT POSITION ADJUSTMENT INFORMATION AND OVERSCAN INFORMATION OF SECONDARY IMAGE PROCESSING DEVICE

IMAGE OUTPUT BY SECONDARY IMAGE PROCESSING DEVICE

RESET POSITION ADJUSTMENT INFORMATION AND OVERSCAN INFORMATION, AND OUTPUT IMAGE OUTPUT BY PRIMARY IMAGE PROCESSING DEVICE AS IT IS

IMAGE DISPLAY APPARATUS AND IMAGE PROCESSING METHOD

CROSS-REFERENCE

The present application claims priority from Japanese Patent Application No. 2010-055452 filed on Mar. 12, 2010, which is hereby incorporated by reference in its entirety.

BACKGROUND

Generally in image display apparatuses such as projectors, image processing for changing the size of image information that is input in various sizes to a predetermined size is performed. In recent years, techniques have been disclosed in which when the size change processing described above is performed, image processing on the input image is performed using a plurality of image processing devices.

As such techniques for example, a technique has been disclosed in which a first resolution converting unit that converts an input image into a fixed resolution-converted image having a resolution equal to at least a horizontal resolution of fixed resolutions and outputs the image, and a second resolution converting unit that converts the fixed resolution-converted image output from the first resolution converting unit into a display resolution-converted image having a desired resolution and outputs the image are provided (for example, refer to Japanese Patent Publication No. 2008-298948).

Another technique has been disclosed in which a scaler unit that converts input signals into an output video format set in advance, and a scaler unit that compares a video region size with the current video format and performs enlargement or reduction processing on signals in the video region to obtain a proper size to thereby output the signals to a display device unit are provided (for example, refer to Japanese Patent Publication No. 2008-096806).

In both of the techniques disclosed in Japanese Patent Publication No. 2008-298948 and Japanese Patent Publication No. 2008-096806, the size change processing is performed on an image using two image processing devices. However, in a case where, for example, position adjustment processing for moving an image in the horizontal direction or the vertical direction is performed, when the position adjustment is performed by an image processing device on the primary side, the burden on the image processing device on the primary side is increased because the image processing device on the primary side performs the size change processing and position adjustment processing on an image. Therefore, this results in a problem that an expensive image processing device with high processing speed has to be used. When the position adjustment is performed by an image processing device on the secondary side, the burden on the image processing device on the primary side can be reduced. However, when the position adjustment of an image is performed, image information originally required is missing, which results in a problem that a proper position adjustment cannot be performed.

SUMMARY

Various embodiments may provide an image display apparatus and an image processing method, both capable of efficiently performing size change processing and position adjustment processing on an image using two image processing devices but without using an expensive image processing device.

According to at least one embodiment of the disclosure, there is provided an image display apparatus including: a primary image processing device that performs image processing for an input image represented by the input image information; a secondary image processing device that performs image processing for the input image processed by the primary image processing device; and a light modulator that modulates an illumination light based on the input image information representing the input image processed by the secondary image processing device, wherein the secondary image processing device performs position adjustment processing, and outputs position information representing the display position of the input image to the primary image processing device after the position adjustment processing on the input image is completed, and the primary image processing device reflects the position information outputted from the secondary image processing device to perform position adjustment on the input image information.

According to the embodiment, when position adjustment processing on an input image is completed, the secondary image processing device outputs position information representing the display position of the input image to the primary image processing device. The primary image processing device reflects the position information set in the secondary image processing device to perform a position adjustment on input image information. Therefore, without using an expensive image processing device for the primary image processing device, size change processing and position adjustment processing on the image can be performed efficiently.

The image display apparatus according to the embodiment may be configured such that the primary image processing device further performs overscan processing. When the position adjustment processing is performed by the secondary image processing device, the overscan processing by the primary image processing device is temporarily disabled and the secondary image processing device is caused to execute the overscan processing, and when the position adjustment processing by the secondary image processing device is completed, the primary image processing device is caused to execute the overscan processing, and the overscan processing by the secondary image processing device is disabled.

According to this configuration of the embodiment, the primary image processing device further performs overscan processing. In case that the secondary image processing device performs position adjustment processing, overscan processing by the primary image processing device is temporarily disabled and the secondary image processing device is caused to execute overscan processing. After position adjustment processing by the secondary image processing device is completed, the primary image processing device is caused to execute overscan processing and overscan processing by the secondary image processing device is disabled. Therefore, without using an expensive image processing device for the primary image processing device, size change processing and overscan processing on an image can be performed efficiently.

The image display apparatus according to the embodiment may be configured such that the position adjustment processing by the secondary image processing device is processing for performing a position adjustment in the horizontal direction of an image.

According to this configuration of the embodiment, position adjustment processing is processing for performing a position adjustment in the horizontal direction of an image, and a position adjustment in the vertical direction can be performed by the secondary image processing device. Therefore, the burden of position adjustment on the primary image processing device can be reduced.

The image display apparatus according to the embodiment may be configured such that the secondary image processing device resets position information in the secondary image processing device after the secondary image processing device outputs the position information to the primary image processing device.

According to this configuration of the embodiment, when the secondary image processing device outputs position adjustment information to the primary image processing device, the position adjustment information is reset. Therefore, the secondary image processing device can output image information on which image processing is performed by the primary image processing device as it is.

According to at least one embodiment of the disclosure, there is provided an image processing method for an image processing device, the image processing device having a primary image processing device that performs image processing for input image information and a secondary image processing device that performs image processing for the input image information processed by the primary image processing device, and generating image information to be supplied to an image display apparatus, the method including: outputting position information representing the display position of the input image represented by the input image information to the primary image processing device after the position adjustment processing on the input image is completed in the secondary image processing device, and reflecting the position information outputted from the secondary image processing device in the primary image processing device so as to perform a position adjustment on the input image information.

According to the aspect of the embodiment, when position adjustment processing on an input image is completed in the secondary image processing step, position information representing the display position of the input image is output, and the position information output in the secondary image processing step is reflected to perform a position adjustment on input image information in the primary image processing step. Therefore, without using an expensive image processing device in the primary image processing step, size change processing and position adjustment processing on an image can be performed efficiently.

The image processing method according to the embodiment may be configured such that the primary image processing device performs overscan processing. When the position adjustment processing is performed in the secondary image processing device, the overscan processing in the primary image processing device is temporarily disabled and the overscan processing is executed in the secondary image processing device, and when the position adjustment processing is completed in the primary image processing device, the overscan processing is executed in the primary image processing device and the overscan processing is disabled in the secondary image processing device.

According to this configuration of the embodiment, overscan processing is further performed in the primary image processing device. When position adjustment processing is performed in the secondary image processing device, overscan processing in the primary image processing device is temporarily disabled and overscan processing is executed in the secondary image processing device. When position adjustment processing in the secondary image processing device is completed, overscan processing is executed in the primary image processing device and overscan processing in the secondary image processing device is disabled. Therefore, without using an expensive image processing device in the primary image processing device, size change processing and overscan processing on an image can be performed efficiently.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EXEMPLARY EMBODIMENTS

Hereinafter, an embodiment of the invention will be described with reference to the drawings.

Figure 1:
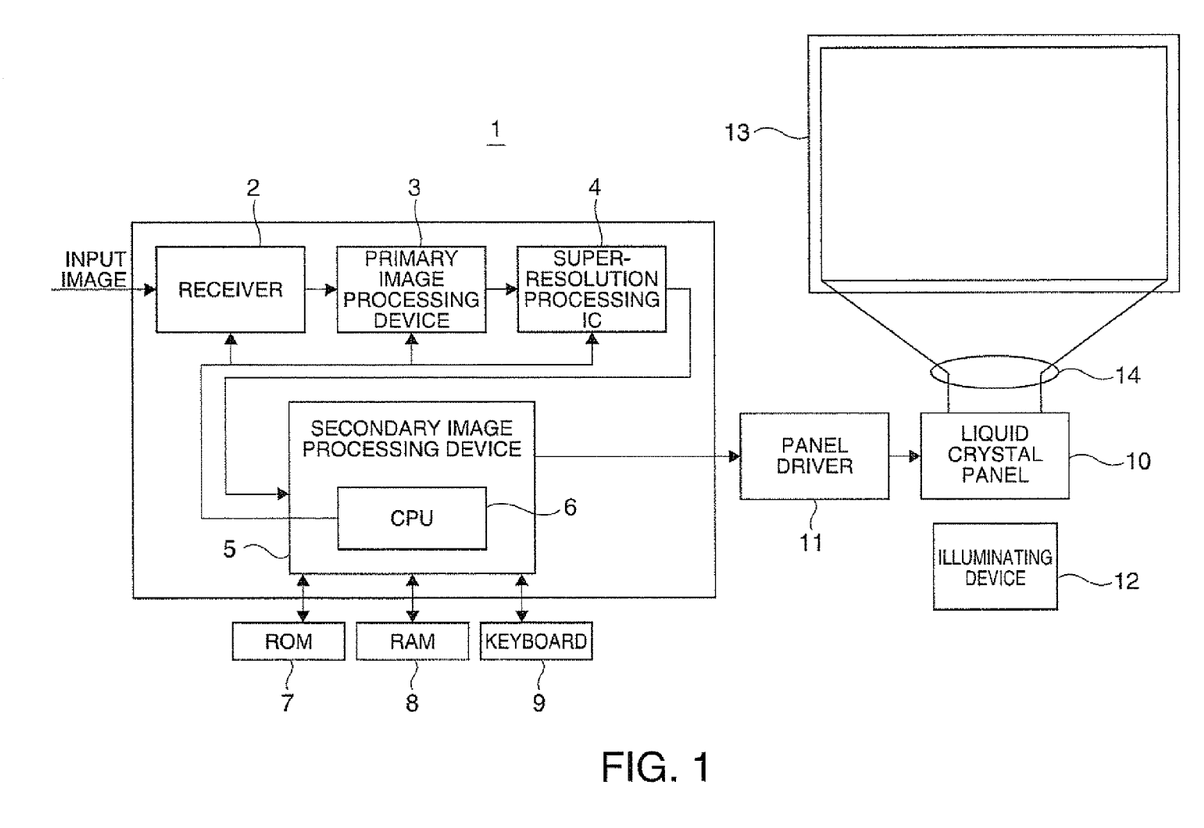
FIG. 1 is a block diagram showing an embodiment of a projector to which image processing devices according to the invention are applied.
Figure 2:
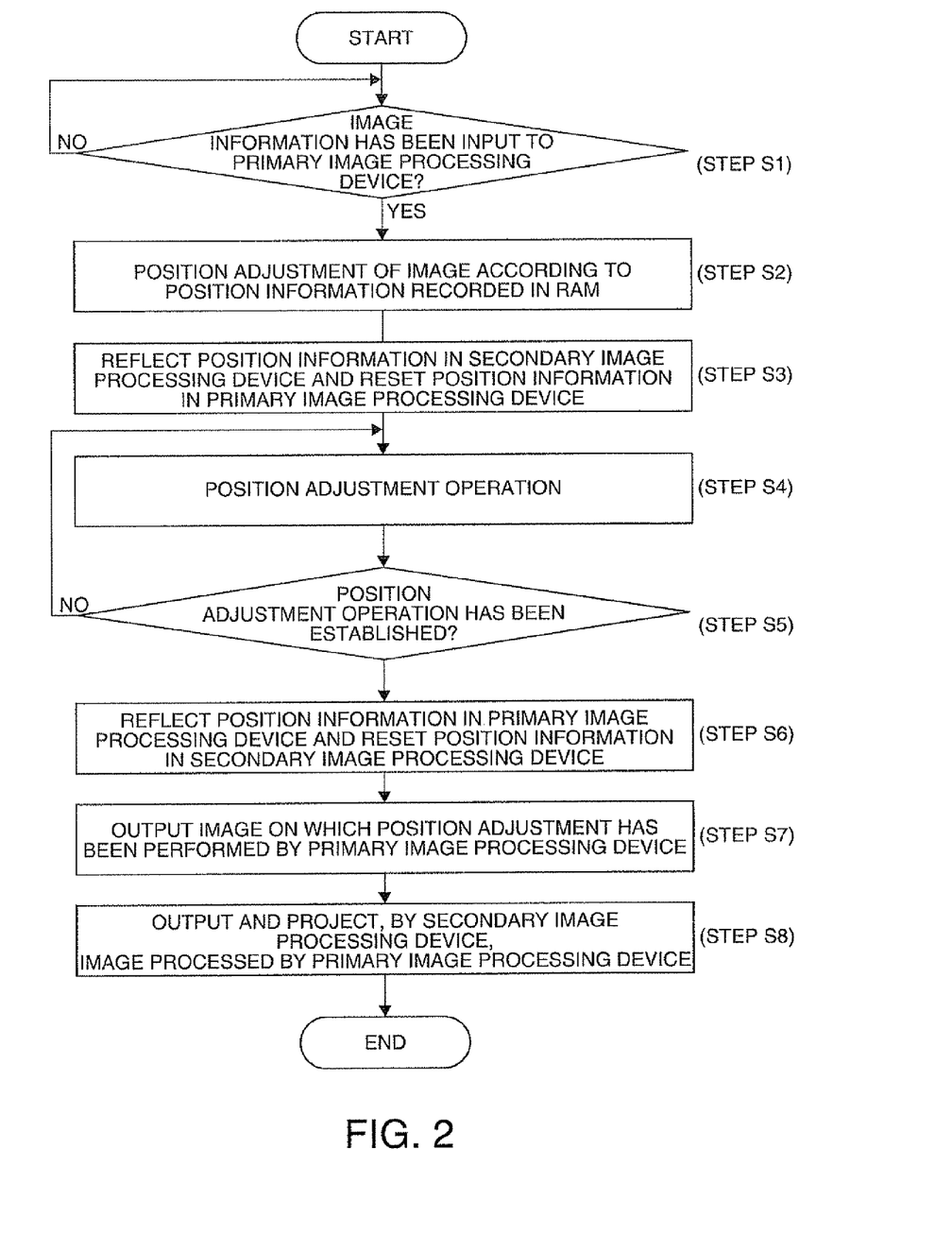
FIG. 2 is a flowchart showing operations when position adjustment processing is performed by an image processing method according to the invention.

FIG. 1 is a schematic block diagram showing an embodiment of a projector as an image display apparatus according to the invention. In the embodiment, the projector 1 includes a receiver 2 to which image information is input. The receiver 2 determines the kind of input image information, converts, if necessary, input image information in the form of analog signals to image information in the form of digital signals, and outputs the image information to a primary image processing device 3.

The primary image processing device 3 performs processing for changing the size of the image information sent from the receiver 2 to a predetermined size. As the image information sent from the receiver 2, there are various kinds of image information such as, for example, image information through video tapes, image information through DVDs, image information through Blu-ray Discs, or image information through digital terrestrial broadcasting. These pieces of image information are different in size. Therefore, the primary image processing device 3 performs the size change processing on the image information so that the various kinds of image information conform to the specifications of the projector 1. The primary image processing device 3 also performs overscan processing for cropping the peripheral portion of image information and enlarging the image information by a relatively low magnification, for example, by from about 1.02 to 1.10 times.

Moreover, the primary image processing device 3 is connected with a super-resolution processing IC 4. The super-resolution processing IC 4 converts the image information sent from the primary image processing device 3 after being subjected to the size change processing into an image improved in sharpness.

The super-resolution processing IC 4 is connected with a secondary image processing device 5. A CPU 6 is incorporated into the secondary image processing device 5. The CPU 6 controls image processing by the secondary image processing device 5 as well as controls the receiver 2, the primary image processing device 3, and the super-resolution processing IC 4. To the secondary image processing device 5, a ROM 7 having a predetermined program recorded therein, a RAM for temporarily storing image information when image processing is performed, and a keyboard 9 for performing a predetermined input operation are connected.

In the embodiment, the primary image processing device 3 is an image processing device that performs image-size change processing by a relatively high magnification but performs position adjustment processing for adjusting the display position of an image at a low processing speed. For the secondary image processing device 5, an image processing device that can perform position adjustment processing at a relatively high speed is used. Accordingly, when the position adjustment of an image is made, the adjustment is made more easily by performing the position adjustment processing with the secondary image processing device. However, when the position adjustment processing is performed by the secondary image processing device 5, image information originally required is missing if the position of an image is shifted, failing to perform a proper position adjustment. This is because overscan processing is performed in the primary image processing device 3 and the peripheral portion cropped by the primary image processing device 3 through the position adjustment appears.

In the embodiment, therefore, after position adjustment processing is performed by the secondary image processing device 5, position information is sent to the primary image processing device 3. The primary image processing device 3 cuts out image information in a required range of the image information input based on the position information and outputs the required image information to the super-resolution processing IC 4 as image information.

Specifically, the secondary image processing device 5 performs position adjustment processing for adjusting the position of an image in the horizontal direction or the vertical direction. When the position adjustment processing is completed by the secondary image processing device 5, the CPU 6 outputs position information to the primary image processing device 3. The primary image processing device 3 reflects the position information sent from the CPU 6 and set in the secondary image processing device 5 to perform the setting of position adjustment on image information input from the receiver 2. After the setting of position adjustment is completed by the primary image processing device 3, the position information set in the secondary image processing device 5 is reset. Thus, the image information on which the primary image processing device 3 performs the setting of position adjustment is output to the secondary image processing device 5 through the super-resolution processing IC 4, and the secondary image processing device 5 outputs the image information as it is.

In the embodiment, the primary image processing device 3 changes the size of the image information sent from the receiver 2 to a predetermined size and performs overscan processing for cropping the peripheral portion of the image information and enlarging the image information by a relatively low magnification, for example, by from about 1.02 to 1.10 times. This is because when enlargement processing is performed in both of the primary image processing device 3 and the secondary image processing device 5, image quality is degraded, and because when image signals in which the sharpness of an image is improved by the super-resolution processing IC 4 is enlarged by the secondary image processing device 5, the sharpness is degraded. Accordingly, when a position adjustment is performed by the secondary image processing device 5, the CPU 6 temporarily sets overscan processing by the primary image processing device 3 to be disabled, and overscan processing is performed by the secondary image processing device 5. When the secondary image processing device 5 executes position adjustment processing and the position adjustment processing is completed, the CPU 6 enables overscan processing by the primary image processing device 3 and outputs position information set in the secondary image processing device 5 to the primary image processing device. In the primary image processing device 3, processing for changing the size to a predetermined size, overscan processing, and the setting of position adjustment are performed simultaneously on image information input from the receiver 2. After the overscan processing and the setting of position adjustment are completed by the primary image processing device 3, the position information set in the secondary image processing device 5 is reset and overscan processing is disenabled. Thus, the image information on which the size change processing, overscan processing, and position adjustment of an image are performed by the primary image processing device 3 is output to the secondary image processing device 5 through the super-resolution processing IC 4, and the secondary image processing device 5 outputs the image information as it is.

The overscan information or position information set in the secondary image processing device 5 is stored in the RAM 8.

In the embodiment, the projector 1 includes a panel driver 11 for driving, for example, a transmissive liquid crystal panel 10 so as to form a predetermined image based on image information output from the secondary image processing device 5. Further, the projector 1 includes an illuminating device 12 for illuminating the liquid crystal panel 10 and a projection optical system 14 that projects a light transmitted through the liquid crystal panel 10 onto a screen 13.

The liquid crystal panel 10 is of the transmissive type and driven by the panel driver 11 based on the image information output from the secondary image processing device 5, so that the liquid crystal panel 10 is used as a light modulator that modulates an illumination light emitted from the illuminating device 12. As the illuminating device 12, for example, a high-pressure mercury lamp or a metal halide lamp is used. The illuminating device 12 and the projection optical system correspond to the projection optical system of the invention.

Although not shown in the drawing, the projector 1 has three liquid crystal panels 10 corresponding to three RGB colors and has a function of processing image information corresponding to three colors. Further, the illuminating device 12 has a colored light separation optical system that separates a white light into three colored lights. Moreover, the projection optical system has a combining optical system that combines three colored image lights to generate an image light representing a colored image. The configuration of such an optical system of the projector 1 is described in detail in, for example, JP-A-10-171045 disclosed by the present applicant, and therefore, the description thereof is omitted.

Next, an image processing method using the above-described image display apparatus according to the invention will be described with reference to a flowchart shown in FIG. 2 and FIGS. 3 to 6.

First, a case will be described in which a position adjustment of an image is performed in a state where position information at the time of projecting a previous image is recorded in the RAM 8.

Figure 3:
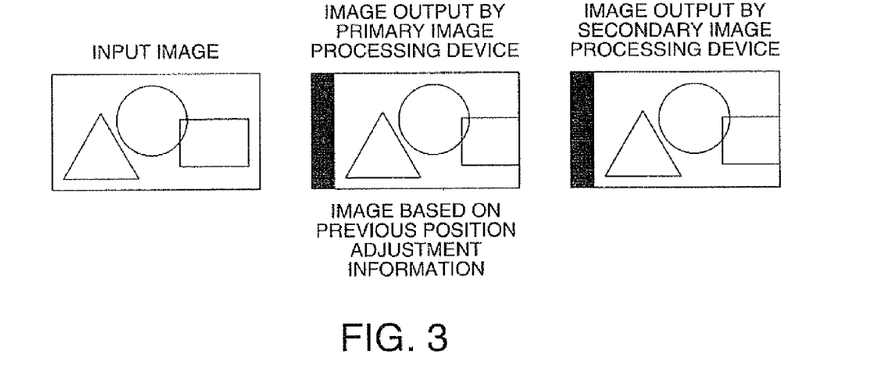
FIG. 3 is an explanatory diagram showing an initial state in the position adjustment processing of the invention.
Figure 4:
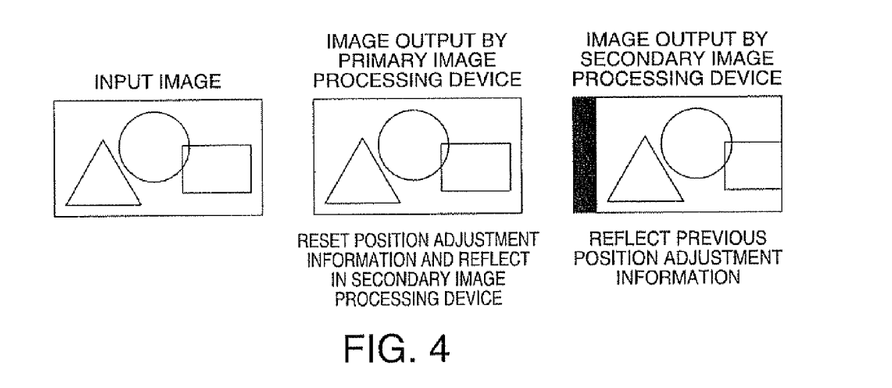
FIG. 4 is an explanatory diagram showing a state of reflecting position adjustment information of a primary image processing device in a secondary image processing device, in the position adjustment processing of the invention.

In a normal display state as shown in FIG. 3, when image information sent from the receiver 2 is input to the primary image processing device 3 (YES in Step S1), the primary image processing device 3 performs the setting of position adjustment of an image according to the position information recorded in the RAM 8 (Step S2) and outputs the image information to the super-resolution processing IC 4. The image information is improved in sharpness in the super-resolution processing IC 4 and sent to the secondary image processing device 5. Next, when a function of adjusting the display position is executed through an operation of the keyboard 9 or the like, the CPU 6 resets the position information of the primary image processing device 3 and causes the secondary image processing device 5 to reflect the position information as shown in FIG. 4 (Step S3). Thus, an image output by the primary image processing device 3 is in a state where position adjustment processing is not performed, while an image output by the secondary image processing device 5 is in a state where position adjustment processing has been performed.

Figure 5:
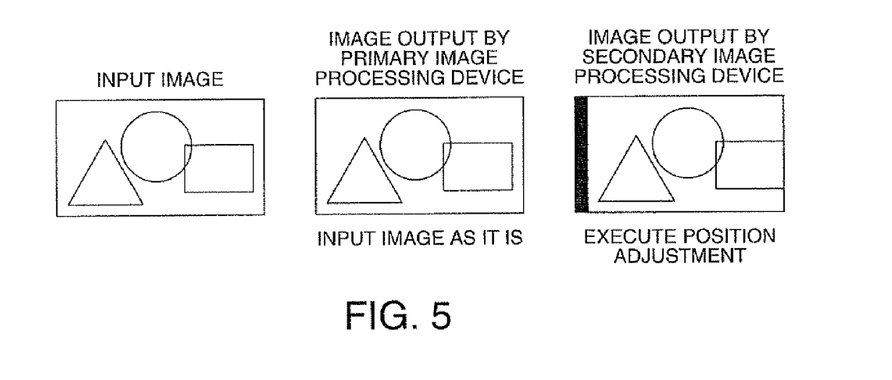
FIG. 5 is an explanatory diagram showing a position adjustment state in the position adjustment processing of the invention.
Figure 6:
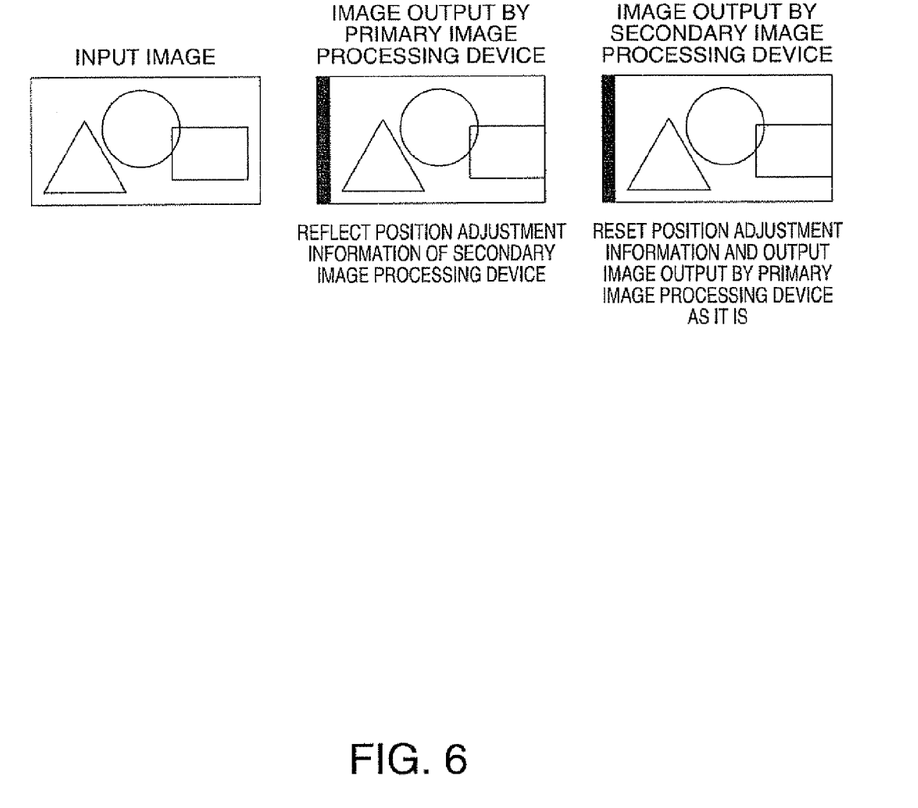
FIG. 6 is an explanatory diagram showing a state after position adjustment in position adjustment processing and overscan processing of the invention.
Figure 7:
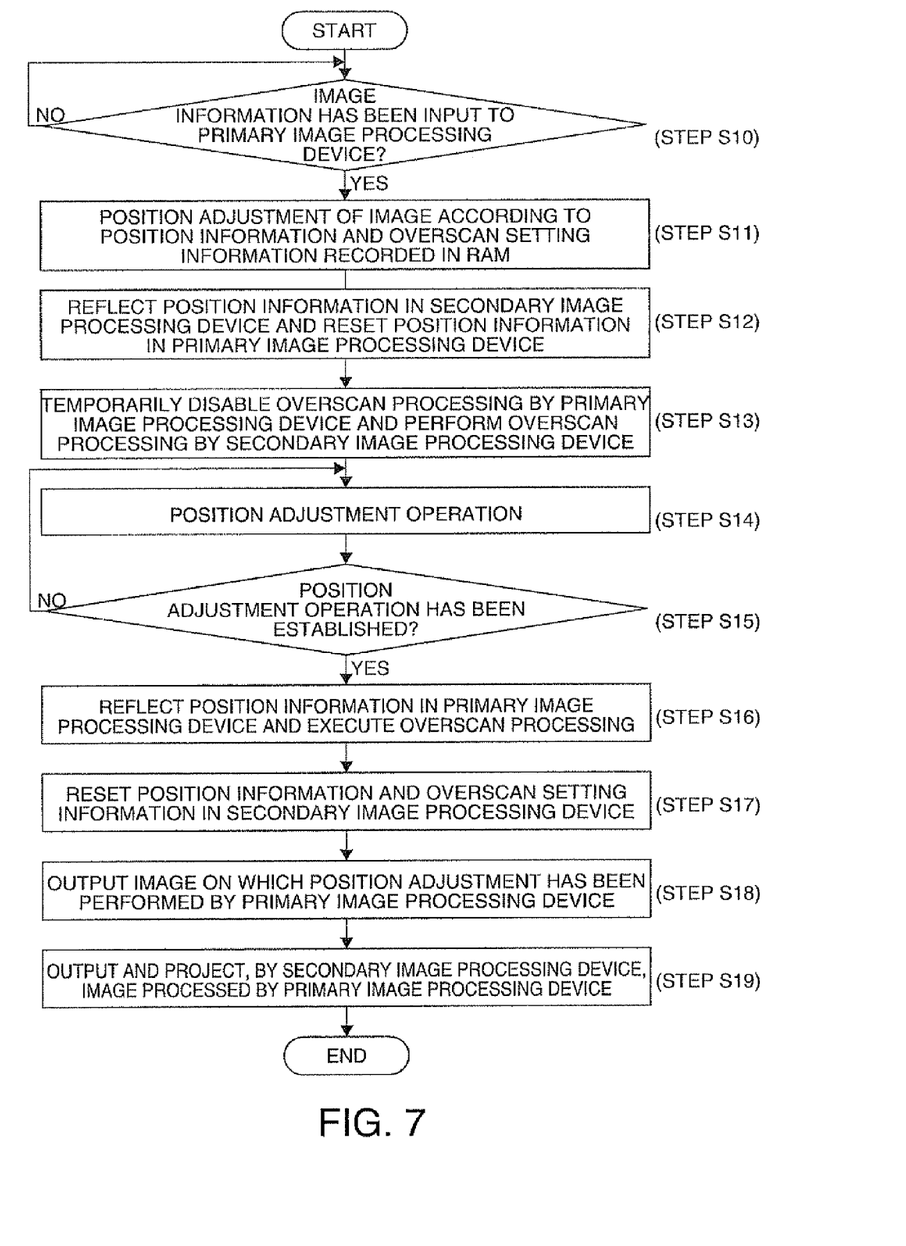
FIG. 7 is a flowchart showing operations when position adjustment processing and overscan processing are performed by the image processing method according to the invention.

Then as shown in FIG. 5, a position adjustment is performed through the operation of the keyboard 9 or the like while viewing a projected image (Step S4). In FIG. 5, the projected image is shown in a state of being slightly shifted leftward from the original state. When the position adjustment operation is completed and the position adjustment is established (YES in Step S5), the CPU 6 causes the primary image processing device 3 to reflect the position information and resets the position information of the secondary image processing device 5 as shown in FIG. 6 (Step S6). Thus, the image on which the position adjustment has been performed by the primary image processing device 3 is sent to the secondary image processing device 5 through the super-resolution processing IC 4 (Step S7), and the secondary image processing device 5 outputs the image to the panel driver 11, whereby the image on which the position adjustment has been performed is projected onto the screen 13 (Step S8).

Next, a case of performing position adjustment processing and overscan processing will be described with reference to a flowchart shown in FIG. 7 and FIGS. 8 to 11.

Figure 8:
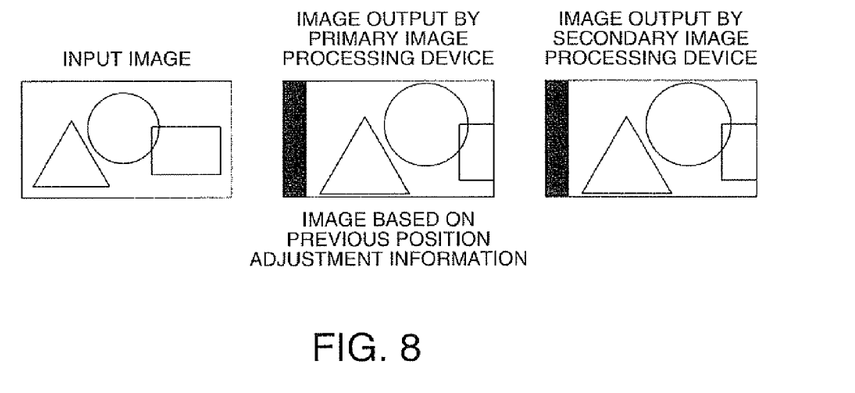
FIG. 8 is an explanatory diagram showing an initial state in the position adjustment processing and the overscan processing of the invention.

In a normal display state as shown in FIG. 8, similarly to the above-described processing, when image information sent from the receiver 2 is input to the primary image processing device 3 (YES in Step S10), the primary image processing device 3 performs the position adjustment and overscan processing on an image according to position information and overscan setting information in the RAM 8 (Step S11) and outputs the image information to the super-resolution processing IC 4. The image information is improved in sharpness in the super-resolution processing IC 4 and sent to the secondary image processing device 5. Next, when the function of adjusting the display position is executed through the operation of the keyboard 9 or the like, the CPU 6 first resets the position information of the primary image processing device 3 and causes the secondary image processing device 5 to reflect the position information as shown in FIG. 9 (Step S12).

Figure 9:
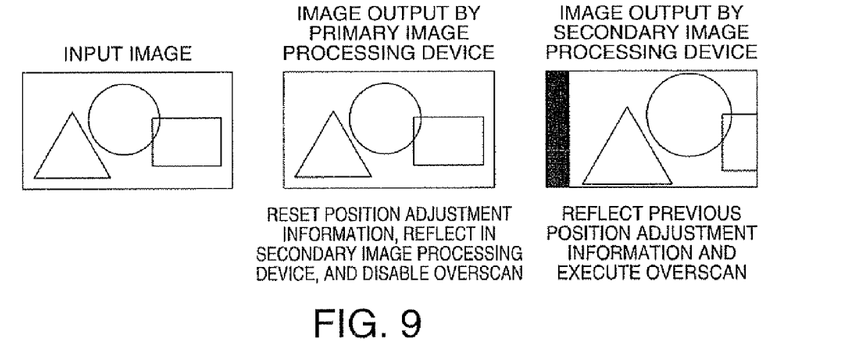
FIG. 9 is an explanatory diagram showing a state where overscan processing by the primary image processing device is disabled and overscan processing is performed by the secondary image processing device, in the position adjustment processing and the overscan processing of the invention.
Figure 10:
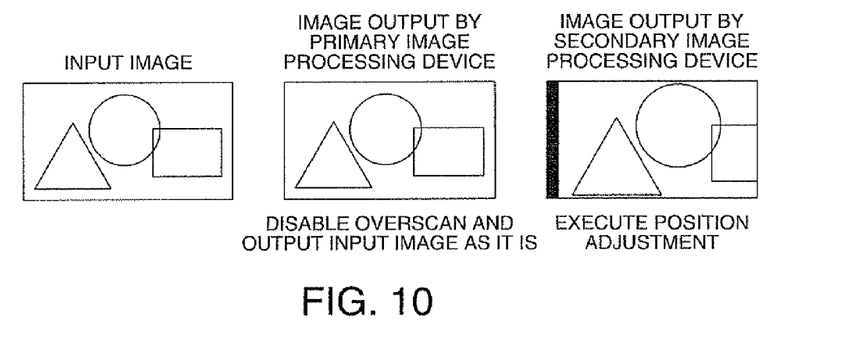
FIG. 10 is an explanatory diagram showing a position adjustment state in the position adjustment processing and the overscan processing of the invention.
Figure 11:
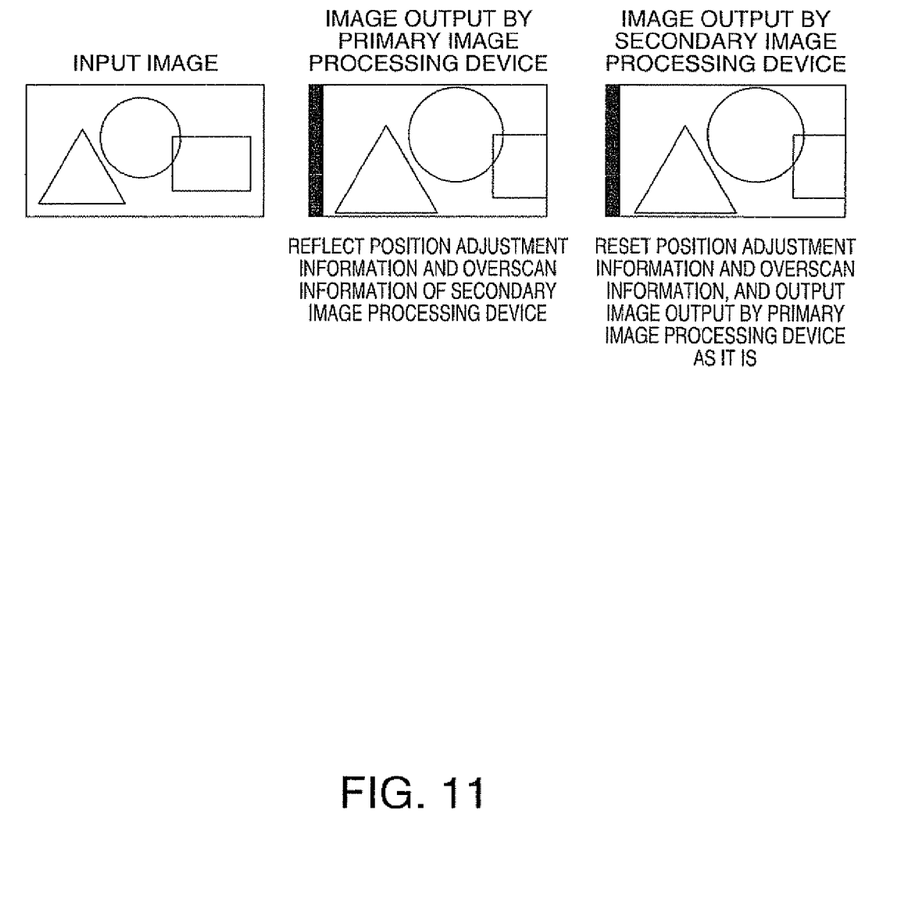
FIG. 11 is an explanatory diagram showing a state after position adjustment and overscan processing in the position adjustment processing and the overscan processing of the invention.

Moreover as shown in FIG. 9, the CPU 6 temporarily sets overscan processing by the primary image processing device 3 to be disabled, and overscan processing is performed by the secondary image processing device 5 (Step S13). Then as shown in FIG. 10, a position adjustment is performed through the operation of the keyboard 9 or the like while viewing a projected image (Step S14). In FIG. 10, the projected image is shown in a state of being slightly shifted leftward from the original state. When the position adjustment operation is completed and the position adjustment is established (YES in Step S15), the CPU 6 causes the primary image processing device 3 to reflect the position information and to execute overscan processing (Step S16). When the overscan processing and the position adjustment processing are completed by the primary image processing device 3, the CPU 6 resets the position information and overscan setting information set in the secondary image processing device 5 (Step S17). Thus as shown in FIG. 11, the image information on which the size change processing, overscan processing, and position adjustment processing of the image have been performed by the primary image processing device 3 is output to the secondary image processing device 5 through the super-resolution processing IC 4 (Step S18), and the secondary image processing device 5 outputs the image information to the panel driver 11, whereby the image on which the position adjustment has been performed is projected onto the screen 13 (Step S19).

In the embodiment as described above, when the position adjustment of an image is performed, position adjustment processing is performed in the secondary image processing device 5, and based on the position information set in the secondary image processing device 5, the position adjustment is performed by the primary image processing device 3. Therefore, without using an expensive image processing device for the primary image processing device 3, position adjustment processing can be performed efficiently.

In the embodiment, position adjustment processing in the horizontal direction or the vertical direction is performed by the secondary image processing device 5. For example, however, the embodiment may be configured such that position adjustment processing only in the horizontal direction is performed by the secondary image processing device 5, that the primary image processing device 3 is caused to reflect the position information, and that position adjustment processing in the vertical direction is performed only by the secondary image processing device 5. In this case, it is possible to reduce the burden of position adjustment on the primary image processing device 3.

Although the projector 1 using the transmissive liquid crystal panel 10 has been described in the embodiment, the invention can be applied to the projector 1 using a reflective liquid crystal panel 10. The term "transmissive" used herein means that the liquid crystal panel 10 is of the type that transmits light, while the term "reflective" means that the liquid crystal panel 10 is of the type that reflects light.

Examples of the projector 1 include a front projection type projector 1 that projects an image from a direction to observe a projection surface and a rear projection type projector 1 that projects an image from a direction opposite to the direction to observe the projection surface. The configuration of the projector 1 shown in FIG. 1 is applicable in either case.

In the embodiment, the white light from the illuminating device 12 is separated into three colored lights using the colored light separation optical system and the respective colored lights are modulated. For example, however, an LED may be used as the illuminating device 12. Alternatively, instead of the liquid crystal panel 10, a color wheel illuminated by the illuminating device 12 may be combined with a device (light modulating unit) that is composed of micromirror pixels and irradiated with a light transmitted through the color wheel to perform the modulation and combining of colored lights.

Further, the invention is not limited to the embodiment but can be modified variously based on the gist of the invention.

What is claimed is:

1. An image display apparatus comprising:
    a primary image processing device that performs image processing for an input image represented by input image information; and
    a secondary image processing device that performs image processing for the input image processed by the primary image processing device; wherein
        the secondary image processing device performs position adjustment processing, and outputs position information representing the display position of the input image to the primary image processing device after the position adjustment processing on the input image is completed,
        the primary image processing device reflects the position information outputted from the secondary image processing device to perform position adjustment on the input image information, and
        the image processing includes processing each of an image color included in the input image at a same time.

2. The image display apparatus according to claim 1, wherein the primary image processing device further performs overscan processing,
    in case that the position adjustment processing is performed by the secondary image processing device, the overscan processing by the primary image processing device is temporarily disabled and the secondary image processing device is caused to execute the overscan processing, and
    after the position adjustment processing by the secondary image processing device is completed, the primary image processing device is caused to execute the overscan processing and the overscan processing by the secondary image processing device is disabled.

3. The image display apparatus according to claim 1, wherein the position adjustment processing by the secondary image processing device is processing for performing a position adjustment in the horizontal direction of an image.

4. The image display apparatus according to claim 1, wherein the secondary image processing device resets position information in the secondary image processing device after the secondary image processing device outputs the position information to the primary image processing device.

5. The image display apparatus according to claim 1, further comprising a light modulator that modulates an illumination light which is processed by the primary and secondary image processing devices, wherein the light modulator is a micro mirror pixel or liquid crystal.

6. An image processing method for an image processing device, the image processing device having a primary image processing device that performs image processing for input image information and a secondary image processing device that performs image processing for the input image information processed by the primary image processing device, and generating image information to be supplied to an image display apparatus, the method comprising:
    outputting position information representing the display position of the input image represented by the input image information to the primary image processing device after the position adjustment processing on the input image is completed in the secondary image processing device, and
    reflecting the position information outputted from the secondary image processing device in the primary image processing device so as to perform a position adjustment on the input image information; wherein
    the image processing includes processing each of an image color included in the input image at a same time.

7. The image processing method according to claim 6, wherein the primary image processing device performs overscan processing,
    when the position adjustment processing is performed in the secondary image processing device, the overscan processing in the primary image processing device is temporarily disabled and the overscan processing is executed in the secondary image processing device, and
    when the position adjustment processing is completed in the primary image processing device, the overscan processing is executed in the primary image processing device and the overscan processing is disabled in the secondary image processing device.

8. The image processing method according to claim 6, wherein the position adjustment processing by the secondary image processing device is processing for performing a position adjustment in the horizontal direction of an image.

9. The image processing method according to claim 6, wherein the secondary image processing device resets position information in the secondary image processing device after the secondary image processing device outputs the position information to the primary image processing device.

* * * * *